(12) United States Patent
Shigemitsu

(10) Patent No.: US 8,674,025 B2
(45) Date of Patent: Mar. 18, 2014

(54) GOLF BALL RESIN COMPOSITION AND GOLF BALL

(75) Inventor: Takahiro Shigemitsu, Kobe (JP)

(73) Assignee: SRI Sports Limited, Kobe (JP)

( * ) Notice: Subject to any disclaimer, the term of this patent is extended or adjusted under 35 U.S.C. 154(b) by 351 days.

(21) Appl. No.: 13/084,128

(22) Filed: Apr. 11, 2011

(65) Prior Publication Data

US 2011/0263351 A1 Oct. 27, 2011

(30) Foreign Application Priority Data

Apr. 27, 2010 (JP) ................................ 2010-102533

(51) Int. Cl.
| | | |
|---|---|---|
| A63B 37/12 | (2006.01) | |
| A63B 37/00 | (2006.01) | |
| C08L 33/02 | (2006.01) | |

(52) U.S. Cl.
USPC ........... 525/195; 525/196; 525/201; 525/221; 525/330.2; 473/373; 473/385

(58) Field of Classification Search
None
See application file for complete search history.

(56) References Cited

U.S. PATENT DOCUMENTS

| | | | |
|---|---|---|---|
| 5,306,760 A | 4/1994 | Sullivan | |
| 5,312,857 A | 5/1994 | Sullivan | |
| 6,123,628 A | 9/2000 | Ichikawa et al. | |
| 6,329,458 B1 | 12/2001 | Takesue et al. | |
| 7,976,410 B2* | 7/2011 | Shindo et al. | 473/373 |
| 8,349,958 B2* | 1/2013 | Shigemitsu et al. | 525/196 |
| 2001/0018375 A1 | 8/2001 | Hayashi et al. | |
| 2002/0099120 A1 | 7/2002 | Takesue et al. | |
| 2002/0111407 A1 | 8/2002 | Takesue et al. | |
| 2005/0170910 A1 | 8/2005 | Hayashi | |
| 2006/0194649 A1 | 8/2006 | Hayashi | |
| 2006/0194650 A1 | 8/2006 | Hayashi | |
| 2007/0100075 A1 | 5/2007 | Takesue | |
| 2008/0287217 A1 | 11/2008 | Takesue et al. | |
| 2009/0111612 A1 | 4/2009 | Nanba et al. | |
| 2009/0233732 A1* | 9/2009 | Shindo et al. | 473/372 |
| 2010/0069173 A1* | 3/2010 | Okabe et al. | 473/372 |
| 2010/0075777 A1* | 3/2010 | Shigemitsu et al. | 473/372 |
| 2010/0093466 A1 | 4/2010 | Ohama et al. | |
| 2010/0160080 A1* | 6/2010 | Isogawa et al. | 473/373 |
| 2011/0319192 A1* | 12/2011 | Shigemitsu | 473/373 |
| 2011/0319196 A1 | 12/2011 | Shigemitsu | |

FOREIGN PATENT DOCUMENTS

| | | |
|---|---|---|
| EP | 0693091 B1 | 10/1997 |
| JP | 6-292740 A | 10/1994 |
| JP | 2000-157646 A | 10/1997 |
| JP | 2001-218873 A | 8/2001 |
| JP | 2002-177414 A | 6/2002 |
| JP | 2002-219195 A | 8/2002 |
| JP | 2005-218858 A | 8/2005 |
| JP | 2009-106739 A | 5/2009 |
| JP | 2010-69251 A | 4/2010 |
| JP | 2010-88797 A | 4/2010 |
| JP | 2010-94393 A | 4/2010 |

OTHER PUBLICATIONS

Honeywell Prodcut Literaure for A-C Polyethylenes and Copolymers Apr. 2000.*
Honeywell Product Literature for AClyn 295P; no date.*
Japanese Notice of Reasons for Rejection, dated Mar. 27, 2012, for Japanese Application No. 2010-102533 (English Translation Only Provided).
English translation of the Japanese Office Action for Application No. 2010-102534 dated Mar. 27, 2012.
English translation of the Japanese Office Action for Application No. 2010-147815 dated Jul. 9, 2013.
English translation of the Japanese Office Action for Application No. 2010-147816 dated Jul. 9, 2013.
United States Office Action for U.S. Appl. No. 13/085,635 dated Jun. 21, 2013.
English translation of Japanese Office Action, dated Oct. 1, 2013, for Japanese Application No. 2010-147815.
English translation of Japanese Office Action, dated Oct. 15, 2013, for Japanese Application No. 2010-147816.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball resin composition with an excellent resilience and fluidity. Another object of the present invention is to provide a golf ball resin composition with a high hardness and durability. Yet another object of the present invention is to provide a golf ball traveling a great distance with an ionomer cover. The present invention provides a golf ball resin composition comprising, (A) an ionomer resin consisting of a metal ion-neutralized product of a binary copolymer composed of an olefin and an $\alpha,\beta$-unsaturated carboxylic acid having 3 to 8 carbon atoms; (B) a binary copolymer composed of an olefin and an $\alpha,\beta$-unsaturated carboxylic acid having 3 to 8 carbon atoms, and (C) a zinc compound, wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 15 g/10 min or more.

17 Claims, 1 Drawing Sheet

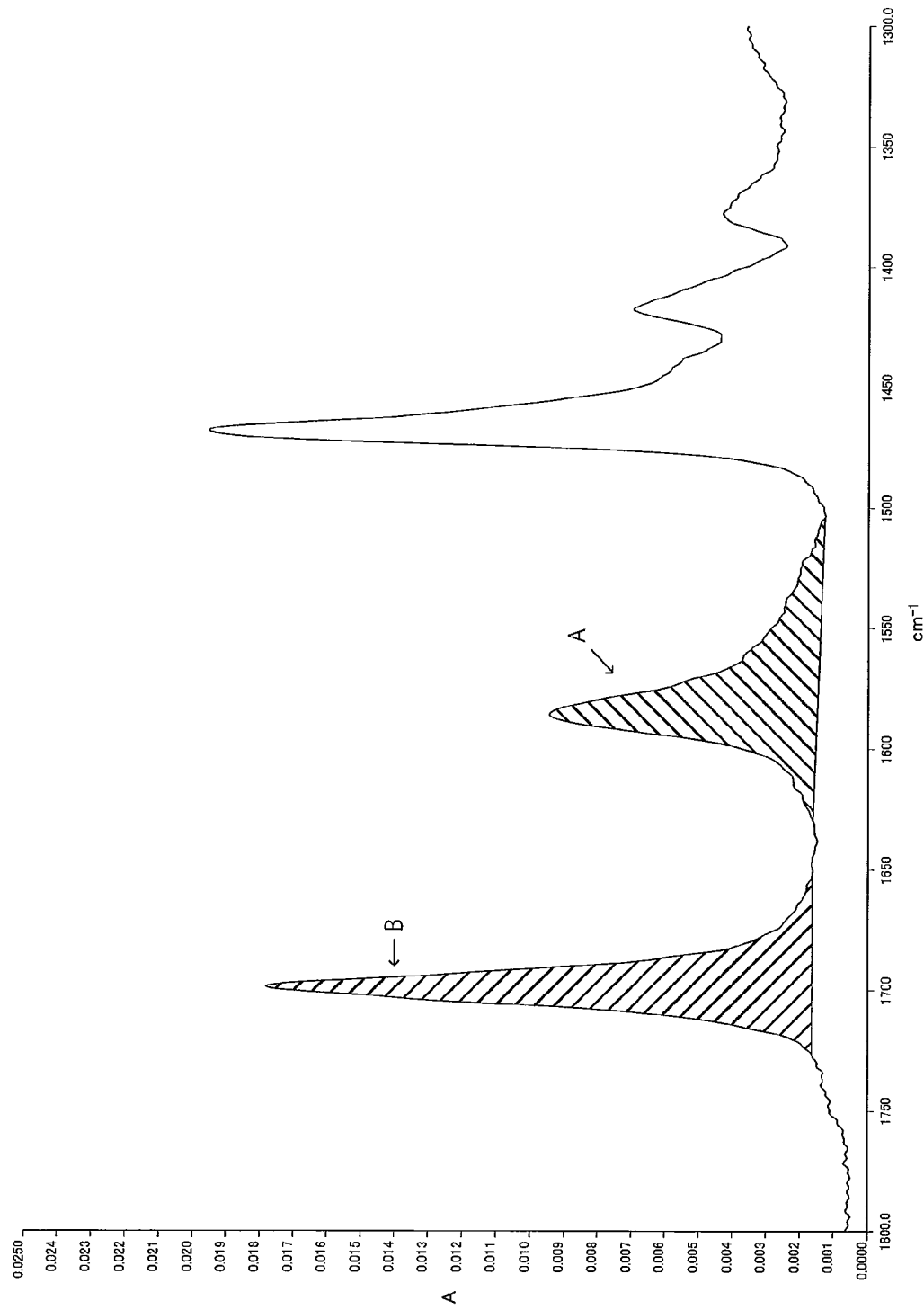

GOLF BALL RESIN COMPOSITION AND GOLF BALL

FIELD OF THE INVENTION

The present invention relates to a golf ball resin composition and a golf ball, in particular, an improvement of a resilience and fluidity of an ionomer resin composition.

DESCRIPTION OF THE RELATED ART

Ionomer resins and polyurethane are used as materials for constituting golf balls. Use of the ionomer resins as the constituting material of the golf ball provides the golf ball traveling a great distance, because of its high stiffness. Accordingly, ionomer resins are widely used as a material constituting a cover or an intermediate layer of the golf ball. However, there still remains a room for further improvement with respect to the stiffness and fluidity thereof and various improvements have been proposed for improving these properties.

Japanese Patent Publication No. 2000-157646 A discloses a golf ball cover composition having a melt index (MI) of 1 dg/sec. or more and primarily comprising a mixture of a base resin, blended with (d) a metal soap obtained by neutralizing an organic acid having up to 29 carbon atoms with a monovalent to trivalent metal ion, in a mass ratio of the base resin to the metal soap being 95:5 to 80:20, wherein the base resin comprises an ionomer resin component containing (a) a ternary ionomer resin consisting of a metal ion neutralized product of an olefin-unsaturated carboxylic acid-unsaturated carboxylate copolymer having an acid content of 12 wt % or less, and (b) a binary ionomer resin consisting of a metal ion neutralized product of an olefin-unsaturated carboxylic acid copolymer having an acid content of 15 wt % or less in a ratio of 40:60 to 100:0; and (c) an unneutralized random copolymer composed of olefin and unsaturated carboxylic acid monomers, in a mass ratio of the ionomer resin component to (c) the unneutralized random copolymer being 75:25 to 100:0.

U.S. Pat. No. 5,306,760 discloses a golf ball comprising a core and a cover, wherein the cover consists essentially of 100 parts by weight of at least one ionomer resin and from about 25 to about 100 parts by weight of fatty acid salt, wherein said ionomer resin is the reaction product of an olefin having from 2 to 8 carbon atoms and an unsaturated monocarboxylic acid having from 3 to 8 carbon atoms.

U.S. Pat. No. 5,312,857 discloses a golf ball comprising a core and a cover, wherein the cover consists essentially of 100 parts by weight of at least one ionomer resin and from about 25 to about 100 parts by weight of a metal stearate, wherein said ionomer resin is the reaction product of an olefin having from 2 to 8 carbon atoms and an unsaturated monocarboxylic acid having from 3 to 8 carbon atoms.

Japanese Patent Publication No. H06-292740 A discloses a composition for a golf ball cover material which comprises (A) 15 to 90 parts by weight of metal salts of an ethylene/ethylenically unsaturated monocarboxylic acid copolymer having an ethylenically unsaturated monocarboxylic acid content of 10 to 30% by weight and a degree of neutralization of at least of 25 mole % and (B) 85 to 10 parts by weight of an ethylene/(meth)acrylate ester/ethylenically unsaturated monocarboxylic acid terpolymer having a (meth)acrylate ester content of 12 to 45% by weight and an ethylenically unsaturated monocarboxylic acid content of 0.5 to 5% by weight.

Japanese Patent Publication No. 2001-218873 A discloses a multi-piece golf ball comprising a solid core, an intermediate layer enclosing the solid core, and a cover enclosing the intermediate layer, wherein at least one of said intermediate layer and said cover is formed of a heated mixture comprising (a) 100 parts by weight of an olefin-unsaturated carboxylic acid random copolymer or an olefin-unsaturated carboxylic acid-unsaturated carboxylate random copolymer or both of them, (b) 5 to 80 parts by weight of a fatty acid having a molecular weight of at least 280 or a derivative thereof, and (c) 0.1 to 10 parts by weight of a basic inorganic metal compound capable of neutralizing acid groups in components (a) and (b), said heated mixture having a melt index of at least 1.0 dg/min, and wherein said intermediate layer has a Shore D hardness of 40 to 63, said cover has a Shore D hardness of 45 to 68, and the Shore D hardness of said solid core at its center is not greater than the Shore D hardness of said intermediate layer, which is not greater than the Shore D hardness of said cover.

Japanese Patent Publication No. 2002-219195 A discloses a golf ball material comprising a mixture which is composed of essential components: 100 parts by weight of a resinous component consisting of a base resin and (e) a non-ionomer thermoplastic elastomer, the base resin and the elastomer being blended in a weight ratio of 100:0 to 50:50; (c) 5 to 80 parts by weight of a fatty acid and/or fatty acid derivative having a molecular weight of 280 to 1,500; and (d) 0.1 to 10 parts by weight of a basic inorganic metal compound capable of neutralizing acidic groups left unneutralized in the base resin and component (c), wherein the base resin has (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion neutralized olefin-unsaturated carboxylic acid-unsaturated carboxylate ternary random copolymer, in a weight ratio of 100:0 to 25:75.

SUMMARY OF THE INVENTION

The improvement in a flight distance of a golf ball using an ionomer resin has been addressed. An approach to improve a flight distance is to enlarge a diameter of a core part having a high resilience. In order to enlarge a diameter of the core, it is necessary to mold a thinner ionomer cover. However, it is difficult to mold a thin ionomer cover by an injection molding method. In addition, the thin ionomer cover often causes a lower durability. Another approach to improve a flight distance is to use an ionomer resin having a high degree of neutralization. However, since the ionomer resin having a high degree of neutralization has low fluidity, it is extremely difficult to injection mold a thin cover. As a method of improving the fluidity of the ionomer resin, it is known that a low molecular weight material such as a fatty acid or a metal salt thereof is added to the ionomer resin having a high degree of neutralization. However, since a considerable amount of the low molecular weight material must be added in order to improve the fluidity, the low molecular weight material tends to bleed out from the surface of the golf ball body, which causes a problem of lower adhesion of the paint film when applying a paint to the surface of the golf ball body. Another method of improving the fluidity of the ionomer resin, it is known that an ethylene-(meth)acrylic acid binary copolymer or an ethylene-(meth)acrylic acid-(meth)acrylic acid ester ternary copolymer is added to the ionomer resin. However, the hardness of the resultant blend becomes low, which causes a shorter flight distance because of an increased spin rate on driver shots.

As described above, in order to improve a flight distance of the golf ball using an ionomer resin as a cover material, it is necessary to use a cover material having a high resilience, mold a thin cover, and increase a cover hardness. However, since the ionomer resin having a high degree of neutralization has a low fluidity, it is difficult to mold a thin cover. Further, the cover having a high hardness causes a problem of lower durability.

The present invention has been achieved in view of the above circumstances. An object of the present invention is to provide a golf ball resin composition with an excellent resilience and fluidity. Another object of the present invention is to provide a golf ball resin composition with a high hardness and durability. Yet another object of the present invention is to provide a golf ball traveling a great distance with an ionomer cover.

The present invention provides a golf ball resin composition comprising, (A) an ionomer resin consisting of a metal ion-neutralized product of a binary copolymer composed of an olefin and an α,β-unsaturated carboxylic acid having 3 to 8 carbon atoms; (B) a binary copolymer composed of an olefin and an α,β-unsaturated carboxylic acid having 3 to 8 carbon atoms, and (C) a zinc compound, wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 15 g/10 min or more.

(A) The binary ionomer resin mainly contained in the golf ball resin composition of the present invention improves the resilience of the resultant golf ball. Further, (B) the binary copolymer composed of an olefin and an α,β-unsaturated carboxylic acid having 3 to 8 carbon atoms improves the fluidity of the golf ball resin composition. Further, the golf ball resin composition of the present invention features (C) a zinc compound. (C) The zinc compound is used to neutralize non-neutralized carboxyl groups existing in (A) component and (B) component, thereby improving a resilience of the resin composition. Since (C) the zinc compound with a relatively slow neutralization rate is used, the neutralization does not proceed so much in a melt-mixing step or an extruding step of the golf ball resin composition. Thus, the golf ball resin composition maintains a good fluidity. Since the neutralization proceed in a step of molding in a mold, the resultant golf ball resin composition has as high resilience as the ionomer resin having a high neutralization degree. Consequently, the golf ball resin composition of the present invention enables to strike a balance between the fluidity and resilience. Further, according to the present invention, use of (C) the zinc compound for neutralizing non-neutralized carboxyl groups existing in (A) component and (B) component provides a golf ball having a good durability, irrespective of the cover having a high hardness. Yet further, since the golf ball resin composition of the present invention does not contain a low molecular material such as a fatty acid or a metal salt thereof which bleeds out from the surface of the golf ball body, the adhesion of the paint film is excellent.

The present invention includes the golf ball resin composition before carboxyl groups existing in (A) component and (B) component are neutralized with (C) the zinc compound, and the golf ball resin composition after the neutralization proceeded. It is noted that the golf ball resin composition after the neutralization proceeded includes the composition after the neutralization proceeded partially. In the present invention, the golf ball resin composition before neutralization may be referred to as "non-neutralized golf ball resin composition," and the golf ball resin composition after neutralization may be referred to as "neutralized golf ball resin composition," respectively. Simply referred "golf ball resin composition" includes both embodiments, unless otherwise described.

The present invention further provides a golf ball having a constituent member formed by injection molding the golf ball resin composition of the present invention. The constituent member preferably includes a cover. In this case, the cover preferably has a thickness ranging from 0.5 mm to 1.5 mm.

According to the present invention, the golf ball resin composition with an excellent resilience and fluidity is obtained. Further, the golf ball resin composition of the present invention has a high hardness and durability. According to the present invention, the golf ball traveling a great distance with an ionomer cover is obtained.

BRIEF DESCRIPTION OF THE DRAWINGS

FIG. 1 is a FT-IR spectrum of one embodiment of the golf ball resin composition of the present invention.

DESCRIPTION OF THE PREFERRED EMBODIMENT

The present invention provides a golf ball resin composition comprising, (A) an ionomer resin consisting of a metal ion-neutralized product of a binary copolymer composed of an olefin and an α,β-unsaturated carboxylic acid having 3 to 8 carbon atoms; (B) a binary copolymer composed of an olefin and an α,β-unsaturated carboxylic acid having 3 to 8 carbon atoms, and (C) a zinc compound, wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin component has a melt flow rate (190° C., 2.16 kg) of 15 g/10 min or more.

First, (A) the ionomer resin consisting of a metal ion-neutralized product of a binary copolymer composed of an olefin and an α,β-unsaturated carboxylic acid having 3 to 8 carbon atoms (hereinafter, sometimes merely referred to as "binary ionomer resin") will be explained. (A) The ionomer resin includes, for example, one prepared by neutralizing at least a part of carboxyl groups in a binary copolymer composed of an olefin and an α,β-unsaturated carboxylic acid having 3 to 8 carbon atoms with a metal ion. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. As (A) the binary ionomer resin, preferred is the metal ion-neutralized product of the binary copolymer composed of ethylene-(meth)acrylic acid. Herein, "(meth)acrylic acid" means acrylic acid and/or methacrylic acid.

The content of the α,β-unsaturated carboxylic acid having 3 to 8 carbon atoms in (A) the binary ionomer resin is preferably 15 mass % or more, more preferably 16 mass % or more, even more preferably 17 mass % or more, and is preferably 30 mass % or less, more preferably 25 mass % or less. If the content of the α,β-unsaturated carboxylic acid having 3 to 8 carbon atoms is 15 mass % or more, the resultant constituent member has a desirable hardness. If the content of the α,β-unsaturated carboxylic acid having 3 to 8 carbon atoms is 30 mass % or less, since the hardness of the resultant constituent member does not become excessively high, the durability and shot feeling become better.

The degree of neutralization of the carboxyl groups contained in the binary ionomer resin is preferably 15 mole % or more, more preferably 20 mole % or more, and is preferably 90 mole % or less, more preferably 85 mole % or less. If the degree of neutralization is 15 mole % or more, the resultant golf ball has better resilience and durability. If the degree of neutralization is 90 mole % or less, the golf ball resin composition has better fluidity (good moldability). The degree of neutralization of the carboxyl groups in the binary ionomer resin can be calculated by the following expression.

Degree of neutralization (mol %) of the binary ionomer resin=(the number of moles of carboxyl groups neutralized in the binary ionomer resin/ the number of moles of all carboxyl groups contained in the binary ionomer resin)×100

Examples of a metal (ion) used for neutralizing at least a part of carboxyl groups of the binary ionomer resin include: monovalent metals ions such as sodium, potassium, lithium, or the like; divalent metals ions such as magnesium, calcium, zinc, barium, cadmium, or the like; trivalent metals ions such as aluminum or the like; and other metals (ions) such as tin, zirconium, or the like. (A) The binary ionomer resin used in the present invention is preferably neutralized with zinc. Use of (A) the binary ionomer resin neutralized with zinc provides a golf ball with a good durability and low temperature durability.

Specific examples of the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

The binary ionomer resins may be used alone or as a mixture of at least two of them. It is noted that Na, Zn, Li, and Mg described in the parentheses after the trade names indicate metal types of neutralizing metal ions of the binary ionomer resins.

(A) The binary ionomer resin preferably has a bending stiffness of 140 MPa or more, more preferably 150 MPa or more, even more preferably 160 MPa or more, and preferably has a bending stiffness of 550 MPa or less, more preferably 500 MPa or less, even more preferably 450 MPa or less. If the bending stiffness of (A) the binary ionomer resin is too low, the flight distance tends to be shorter because of the increased spin rate on driver shots. If the bending stiffness is too high, the durability of the golf ball may be lowered.

The melt flow rate (190° C., 2.16 kg) of (A) the binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, even more preferably 15 g/10 min or less. If the melt flow rate of (A) the binary ionomer resin is 0.1 g/10 min or more, the golf ball resin composition has better fluidity, and for example, it is easy to mold the thin-walled cover. If the melt flow rate of (A) the binary ionomer resin is 30 g/10 min or less, the durability of the resultant golf ball becomes better.

(A) The binary ionomer resin preferably has a slab hardness of 50 or more, more preferably 55 or more, even more preferably 60 or more, and preferably has a slab hardness of 75 or less, more preferably 73 or less, even more preferably 70 or less in Shore D hardness. If the binary ionomer resin has a slab hardness of 50 or more in Shore D hardness, the resultant constituent member has a high hardness. If the binary ionomer resin has a slab hardness of 75 or less in Shore D hardness, the resultant constituent member does not become excessively hard and thus the obtained golf ball has better durability.

Next, (B) the binary copolymer composed of an olefin and an α,β-unsaturated carboxylic acid having 3 to 8 carbon atoms (hereinafter, sometimes merely referred to as "binary copolymer") will be explained. The binary copolymer enhances the fluidity of the golf ball resin composition.

(B) The binary copolymer is a nonionic copolymer of an olefin and an α,β-unsaturated carboxylic acid having 3 to 8 carbon atoms wherein the carboxyl groups thereof are not neutralized. Examples of the olefin and the α,β-unsaturated carboxylic acid having 3 to 8 carbon atoms include the same olefin and α,β-unsaturated carboxylic acid having 3 to 8 carbon atoms exemplified as constituents of "(A) the binary ionomer resin." (B) The binary copolymer preferably includes a binary copolymer composed of ethylene and (meth)acrylic acid.

The melt flow rate (190° C., 2.16 kg) of (B) the binary copolymer is preferably 100 g/10 min or more, more preferably 150 g/10 min or more, and even more preferably 200 g/10 min or more, and is preferably 1,500 g/10 min or less, more preferably 1,000 g/10 min or less even more preferably 800 g/10 min or less. If the melt flow rate (190° C., 2.16 kg) of (B) the binary copolymer is 100 g/10 min or more, the golf ball resin composition has better fluidity, and thus it is easy to mold a thin cover. If the melt flow rate (190° C., 2.16 kg) of (B) the binary copolymer is 1,500 g/10 min or less, the resultant golf ball has better durability.

Specific examples of (B) the binary copolymer include an ethylene-methacrylic acid copolymer such as "NUCREL (registered trademark) (e.g. NUCREL N1050H, NUCREL N2050H, NUCREL AN4318, NUCREL N1110H, NUCREL N0200H) manufactured by Du Pont-Mitsui Polychemicals Co, and an ethylene-acrylic acid copolymer such as "PRIMACORE (registered trademark) 59801" available from Dow Chemical Company.

Next, (C) the zinc compound will be explained. (C) The zinc compound is used to neutralize non-neutralized carboxyl groups existing in (A) component and (B) component, thereby improving the resilience of the resin composition. Since (C) the zinc compound with a relatively slow neutralization rate is used, the neutralization does not proceed so much in a melt-mixing step or an extruding step of the golf ball resin composition. Thus, the golf ball resin composition maintains a good fluidity. Since the neutralization proceed in a step of molding in a mold, the resultant golf ball resin composition has as high a resilience as the ionomer resin having a high neutralization degree. Examples of (C) the zinc compounds are an oxide (zinc oxide), a hydroxide (zinc hydroxide), a sulfide (zinc sulfide), a phosphide, a halide (zinc fluoride, zinc chloride, zinc bromide, zinc iodide), a salt of an oxoacid (zinc sulfate, zinc carbonate, zinc phosphate), an organic zinc compound (dimethylzinc, diphenylzinc, etc), and a complex compound, in addition to a zinc powder. Among them, as (C) the zinc compound, preferred is zinc oxide (ZnO), zinc hydroxide (Zn(OH)$_2$), or zinc carbonate (ZnCO$_3$). Since these zinc compound have an appropriate neutralizing ability, it is possible to strike a balance between the fluidity and resilience. (C) The zinc compound, without limitation, preferably has shapes such as a granular form, plate-like form, needle-like form, and a tetra pod form (for example, "Pana-tetra" available from AMTEC. Co., Ltd.). It is noted that the zinc oxide is used as a pigment or a specific gravity adjusting agent for the cover, but the surface of the zinc oxide for use in the pigment or the specific gravity adjusting agent is often treated in order to improve the dispersibility to the cover material. On the other hand, the zinc oxide used in the present invention is preferably not surface-treated or slightly surface-treated in order to enhance the neutralization ability.

If the golf ball resin composition before injection molding is analyzed with FT-IR (Fourier transform infrared spectrophotometer), A1 is defined as an area under a peak around 1600 cm$^{-1}$ and B1 is defined as an area under a peak around 1700 cm$^{-1}$ in the obtained spectrum and P1 is defined by the following equation; P1=A1/(A1+B1). P1 is preferably 0.20 or more, more preferably 0.21 or more, even more preferably 0.25 or more, and is preferably 1.0 or less, more preferably 0.99 or less, even more preferably 0.5 or less. If P1 falls within the above range, the golf ball resin composition has a good fluidity at the injection molding. In the equation, A1 corresponds to an area under the peak attributed to the neutralized carboxyl group, and B1 corresponds to an area under the peak attributed to the non-neutralized carboxyl group. P1 is defined as a ratio of the neutralized carboxyl groups to the whole carboxyl groups and indicates a degree of neutralization of the golf ball resin composition.

If the golf ball resin composition after injection molding is analyzed with FT-IR (Fourier transform infrared spectrophotometer), A2 is defined as an area under a peak around 1600 cm$^{-1}$ and B2 is defined as an area under a peak around 1700 cm$^{-1}$ in the obtained spectrum and P2 is defined by the following equation; P2=A2/(A2+B2). P2 is preferably 0.3 or more, more preferably 0.31 or more, and is preferably 1.0 or less, more preferably 0.99 or less. If P2 falls within the above range, the golf ball resin composition has a good resilience. In the equation, A2 corresponds to an area under the peak attributed to the neutralized carboxyl group, and B2 corresponds to an area under the peak attributed to the non-neutralized carboxyl group. P2 is defined as a ratio of the neutralized carboxyl groups to the whole carboxyl groups and indicates a degree of neutralization of the golf ball resin composition.

P2/P1 is preferably 1.5 or more, more preferably 1.6 or more, even more preferably 1.7 or more and is preferably 2.5 or less, more preferably 2.4 or less, even more preferably 2.3 or less. P2/P1 indicates a change in the degree of the neutralization of the golf ball before and after the injection molding. If P2/P1 is equal to or more than the lower limit, the effect of improving the resilience by the neutralization with the zinc compound becomes large, while if P2/P1 is equal to or less than the upper limit, the neutralization does not proceed excessively. Thus, the golf ball resin composition maintains the fluidity and the injection molding becomes easy.

In the golf ball resin composition, a content ratio (A)/(B) of (A) the binary ionomer resin to (B) the binary copolymer preferably ranges from 50/50 to 80/20, more preferably from 55/45 to 75/25, even more preferably 60/40 to 70/30 in a mass ratio. If the content ratio (A)/(B) of (A) component to (B) component falls within the above range, it becomes easy to strike a balance between the high hardness and high fluidity.

The content of (C) the zinc compound contained in the golf ball resin composition of the present invention is preferably 0.1 part by mass or more, more preferably 0.2 part by mass or more, even more preferably 0.5 part by mass or more, and is preferably 20 parts by mass or less, more preferably 15 parts by mass or less, even more preferably 10 parts by mass or less with respect to 100 parts by mass of a sum of (A) component and (B) component. If the content of (C) the zinc compound is 0.1 part by mass or more with respect to 100 parts by mass of a sum of (A) component and (B) component, the durability of the obtained golf ball improves. On the other hand, if the content of (C) the zinc compound is 20 parts by mass or less with respect to 100 parts by mass of a sum of (A) component and (B) component, the golf ball resin composition can maintain the fluidity.

In the present invention, the golf ball resin composition may further contain a pigment component such as a white pigment (for example, titanium oxide), a blue pigment or the like; a specific gravity adjusting agent; a dispersant; an antioxidant; an ultraviolet absorber; a light stabilizer; a fluorescent material; a fluorescent brightener; or the like, as long as they do not impair the effect of the present invention. In the golf ball resin composition, a fatty acid or a metal salt thereof may be used in combination as a fluidity improving agent to the extent that the effect of the present invention does not deteriorate. However, it is not preferable that the low molecular materials such as the fatty acid or the metal salt thereof are used in combination, because the low molecular materials causes low adhesion of the paint film and low mechanical properties.

The amount of the white pigment (for example, titanium oxide), with respect to 100 parts by mass of the resin component, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the constituent member of the golf ball. If the amount of the white pigment is more than 10 parts by mass, the durability of the constituent member of the golf ball may deteriorate.

The golf ball resin composition of the present invention preferably consists of (A) the binary ionomer resin and (B) the binary copolymer as a resin component, but may further contain another thermoplastic elastomer or another thermoplastic resin to the extent that the effect of the present invention does not deteriorate. In this case, the total content of (A) the binary ionomer resin and (B) the binary copolymer in the resin component of the golf ball resin composition is preferably 50 mass % or more, more preferably 70 mass % or more, even more preferably 90 mass % or more.

Examples of other thermoplastic elastomers are a thermoplastic polyamide elastomer having a commercial name of "Pebax (registered trademark) (e.g. "Pebax 2533")" commercially available from Arkema K. K.; a polyurethane elastomer having a commercial name of "Elastollan (registered trademark) (e.g. "Elastollan XNY85A")" commercially available from BASF Japan Ltd; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation. Examples of the thermoplastic resin include an ionomer resin of the ternary copolymer composed of an olefin, α,β-unsaturated carboxylic acid having 3 to 8 carbon atoms, and α,β-unsaturated carboxylic acid ester.

The golf ball resin composition of the present invention can be obtained, for example, by dry blending (A) the binary ionomer resin, (B) the binary copolymer, and (C) the zinc compound. The dry blended mixture may be extruded in the form of pellet. The dry blending may be carried out using for example, a mixer capable of blending a raw material in the form of pellet, more preferably a tumbler type mixer. Extruding can be carried out by publicly known extruders such as a single-screw kneading extruder, a twin-screw kneading extruder, and a twin-single kneading extruder. The extruding condition is not particularly limited. For example, in the case of extruding with a twin-screw kneading extruder, the preferable conditions are screw diameter=45 mm; screw revolutions=50 rpm to 400 rpm; screw L/D=35, and cylinder temperature; 140° C. to 200° C. If the extruding temperature exceeds 200° C., the neutralization proceeds and the fluidity may be lowered.

The melt flow rate (190° C., 2.16 kg) of the golf ball resin composition of the present invention is preferably 15 g/10 min or more, more preferably 16 g/10 min or more, and even more preferably 18 g/10 min or more, and is preferably 100 g/10 min or less, more preferably 70 g/10 min or less, even more preferably 40 g/10 min or less. If the melt flow rate of the golf ball resin composition falls within the above range, the moldability becomes better.

The golf ball resin composition of the present invention preferably has a slab hardness of 55 or more, more preferably 57 or more, even more preferably 60 or more, and preferably has a slab hardness of 75 or less, more preferably 73 or less, even more preferably 70 or less in Shore D hardness. Use of the golf ball resin composition having a slab hardness of 55 or more in Shore D hardness reduces the spin rate of the resultant golf ball on driver shots. Thus, the golf ball traveling a great distance is obtained. On the other hand, use of the golf ball resin composition having a slab hardness of 75 or less in Shore D hardness provides a golf ball with excellent durability. Herein, the slab hardness of the golf ball resin composition is a measured hardness of the golf ball resin composition that is molded into a sheet form by a measuring method described later.

The golf ball of the present invention is not limited, as long as it comprises a constituent member formed from the golf ball resin composition of the present invention. For example, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), anyone of constituent members is formed from the above golf ball resin composition. In one preferable embodiment, the golf ball has the cover that is injection molded from the golf ball resin composition of the present invention. In the followings, the present invention will be explained based on the preferable embodiment where the golf ball resin composition of the present invention is used as the cover composition. However, the present invention is not limited to this embodiment.

The cover of the golf ball of the present invention is formed from a cover composition. An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). The cover of the golf ball of the present invention is preferably formed by injection molding. The cover can be produced more easily by injection molding.

In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover.

In the case of molding the cover using the injection molding apparatus provided with an injection unit and a mold unit, a temperature (setting temperature of the injection unit) at the cylinder (barrel) portion of the injection unit is preferably 200° C. or more, more preferably 210° C. or more, and is preferably 270° C. or less, more preferably 260° C. or less. If the temperature of the cylinder (barrel) portion falls within the above range, the golf ball resin composition can maintain the fluidity and the neutralization of non-neutralized carboxyl groups existing in (A) component and (B) component with (C) the zinc compound proceeds.

When molding a cover, the concave portions called "dimple" are usually formed on the surface. After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in deteriorating flying performance of the golf ball.

In the present invention, the thickness of the cover of the golf ball is preferably 1.5 mm or less, more preferably 1.3 mm or less, even more preferably 1.0 mm or less. If the thickness of the cover is 1.5 mm or less, the resilience can be enhanced by enlarging a diameter of the core. The thickness of the cover is preferably 0.5 mm or more, more preferably 0.6 mm or more, and even more preferably 0.7 mm or more. If the thickness of the cover is less than 0.5 mm, it may become difficult to mold the cover.

The cover preferably has a slab hardness of 55 or more, more preferably 57 or more, even more preferably 60 or more, and preferably has a slab hardness of 75 or less, more preferably 73 or less, even more preferably 70 or less in Shore D hardness. If the slab hardness of the cover is less than 55 in Shore D hardness, the spin rate on driver shots increase. Thus, the flight distance becomes shorter. On the other hand, if the slab hardness of the cover is more than 75 in Shore D hardness, the durability of the resultant golf ball may be lowered. Herein, the slab hardness of the cover is a measured hardness of the cover composition that is molded into a sheet form by a measuring method described later.

Next, the core used for the golf ball of the present invention will be explained. The construction of the core includes a single-layered core, and a core having a center and at least one intermediate layer covering the center. The core having a center and at least one intermediate layer covering the center includes a core consisting of a center and a single-layered intermediate layer covering the center and a core consisting of a center and multi-piece of or multi-layer of the intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The center or core of the golf ball of the present invention can be molded by, for example, heat-pressing a rubber composition (hereinafter, sometimes simply referred to as "core rubber composition") containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and an ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior resilience property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of the co-crosslinking agent must be increased in order to obtain the appropriate hardness, which tends to cause the insufficient resilience.

The co-crosslinking agent is not particularly limited as long as it serves to crosslink a rubber molecule by graft polymerization to a base rubber molecular chain; for example, $\alpha,\beta$-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 20 parts or more, and is preferably 50 parts or less, more preferably 40 parts or less, based on 100 parts of the base rubber by mass. If the amount of the co-crosslinking agent to be used is less than 10 parts by mass, the amount of the organic peroxide must be increased to obtain an appropriate hardness, which tends to lower the resilience. On the other hand, if the amount of the co-crosslinking agent to be used is more than 50 parts by mass, the core becomes too hard, so that the shot feeling may be lowered.

The filler contained in the core rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 part or more, and is preferably 50 parts or less, more preferably 35 parts or less based on 100 parts of the base rubber by mass. If the amount of the filler to be blended is less than 2 part by mass, it becomes difficult to adjust the weight, while if it is more than 50 parts by mass, the weight ratio of the rubber component becomes small and the resilience tends to be lowered.

As the core rubber composition, an organic sulfur compound, an antioxidant or a peptizing agent may be blended appropriately in addition to the base rubber, the crosslinking initiator, the co-crosslinking agent and the filler.

As the organic sulfur compound, diphenyl disulfide or a derivative thereof may be preferably used. Examples of the diphenyl disulfide or the derivative thereof include diphenyl disulfide; mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; tri-substituted diphenyl disulfide such as bis (2,4,6-trichlorophenyl)disulfide, and bis(2-cyano-4-chloro-6-bromophenyl)disulfide; tetra-substituted diphenyl disulfide such as bis(2,3,5,6-tetra chlorophenyl)disulfide; penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide or bis(pentabromophenyl)disulfide is preferably used since the golf ball having particularly high resilience can be obtained. The amount of the diphenyl disulfide or the derivative thereof to be blended is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the core rubber composition should be determined depending on the rubber composition. Specifically, the press-molding is preferably carried out for 10 to 60 minutes at the temperature of 130° C. to 200° C. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

In the case that the core consists of a center and at least one intermediate layer covering the center, the center can be formed from the core rubber composition described above. The diameter of the center is preferably 34.8 mm or more, more preferably 35.0 mm or more, and is preferably 41.2 mm or less, more preferably 41.0 mm or less. If the diameter of the center is less than 34.8 mm, the intermediate layer or the cover layer must be made thicker than the desired thickness, resulting in the lowered resilience. On the other hand, if the diameter of the center is more than 41.2 mm, the intermediate layer or the cover must be made thinner than the desired thickness, and hence the intermediate layer or the cover does not function well.

In the case that the center has a diameter of from 34.8 mm to 41.2 mm, the compression deformation amount (deformation amount along the shrinkage direction) of the center when applying a load from 98 N as an initial load to 1275 N as a final load is preferably 1.90 mm or more, more preferably 2.00 mm or more, even more preferably 2.10 mm or more, and is preferably 5.00 mm or less, more preferably 4.90 mm or less, and even more preferably 4.80 mm or less. If the above deformation amount is 1.90 mm or more, the shot feeling becomes better, while if the above deformation amount is 5.00 mm or less, the resilience becomes better.

The center preferably has a surface hardness of 45 or more, more preferably 50 or more, even more preferably 55 or more, and preferably has a surface hardness of 65 or less, more preferably 62 or less, even more preferably 60 or less in Shore D hardness. If the surface hardness of the center is 45 or more in Shore D hardness, the center is not excessively soft, and the resilience becomes better. On the other hand, if the surface hardness of the center is 65 or less in Shore D hardness, the center does not become excessively hard and the shot feeling becomes better.

Examples of the material for the intermediate layer are a cured product of the rubber composition; a conventional ionomer resin; a thermoplastic polyamide elastomer having a commercial name of "Pebax (registered trademark) (e.g. Pebax 2533)" available from Arkema; a thermoplastic polyester elastomer having a commercial name of "Hytrel (registered trademark) (e.g. Hytrel 3548, Hytrel 4047)" available from Du Pont-Toray Co., Ltd.; a thermoplastic polyurethane elastomer having a commercial name of "Elastollan (registered trademark) (e.g. Elastollan XNY97A)" available from BASF Japan Co., a thermoplastic polystyrene elastomer having a commercial name of "Rabalon (registered trademark) (e.g. Rabalon SR04, Rabalon T3339C, Rabalon T3221C)" available from Mitsubishi Chemical Corporation. The above materials for the intermediate layer can be used solely or as a mixture of at least two of them.

Examples of the ionomer resin include one prepared by neutralizing at least a part of carboxyl groups in a copolymer, composed of ethylene and an $\alpha,\beta$-unsaturated carboxylic acid having 3 to 8 carbon atoms with a metal ion; one prepared by neutralizing at least a part of carboxyl groups in a terpolymer composed of ethylene, an $\alpha,\beta$-unsaturated carboxylic acid having 3 to 8 carbons atoms, and an $\alpha,\beta$-unsaturated carboxylic acid ester with a metal ion; or a mixture of these two.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM7311 (Mg), Himilan AM7329 (Zn); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 6320 (Mg), Surlyn 8120 (Na), Surlyn 8320 (Na), Surlyn 9320 (Zn))" and the ternary copolymerized ionomer such as "HPF 1000 (Mg), HPF 2000 (Mg)" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins. The intermediate layer may further contain a specific gravity adjusting agent such as barium sulfate or tungsten or the like; an antioxidant; or a pigment component.

A method for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow-shells to the compression-molding.

In the case of using the intermediate layer composition containing a rubber composition as a main component (50 mass % or more), the intermediate layer preferably has a thickness of 1.2 mm or more, more preferably 1.8 mm or more, even more preferably 2.4 mm or more, and preferably has a thickness of 6.0 mm or less, more preferably 5.2 mm or less, even more preferably 4.4 mm or less.

In the case of using the intermediate layer composition containing the resin composition as a main component (50 mass % or more), the intermediate layer preferably has a thickness of 0.3 mm or more, more preferably 0.4 mm or more, even more preferably 0.5 mm or more, and preferably has a thickness of 2.5 mm or less, more preferably 2.4 mm or less, even more preferably 2.3 mm or less. If the thickness of the intermediate layer is more than 2.5 mm, the resilience performance of the obtained golf ball may be lowered, while if the thickness of the intermediate layer is less than 0.3 mm, it may be difficult to suppress the excessive spin rate on the driver shot.

The intermediate layer of the golf ball of the present invention preferably has a slab hardness of 30 or larger, more preferably 34 or larger, and even more preferably 37 or larger, and preferably has a slab hardness of 65 or smaller, more preferably 62 or smaller, and even more preferably 60 or smaller in Shore D hardness. The intermediate layer having the slab hardness of 30 or more in shore D hardness makes the core have the higher degree of "hard outer and soft inner" structure, thereby providing a high launch angle and a less amount of spin and hence achieving a great flight distance of the gold ball. On the other hand, the intermediate layer having the slab hardness of 65 or less in shore D hardness provides an excellent shot feeling as well as improves the spin performance of the golf ball, thereby improving controllability of the golf ball. Herein, the slab hardness of the intermediate layer is the measured hardness of the intermediate layer composition in the form of a sheet, and is measured by a later-described measuring method. The slab hardness of the intermediate layer can be adjusted, for example, by appropriately selecting a combination of the above resin component and the rubber material and the amount of additives.

The core used in the golf ball of the present invention preferably has a diameter of 40.4 mm or larger, more preferably 40.6 mm or larger, and even more preferably 40.8 mm or larger, and preferably has a diameter of 42.4 mm or smaller, more preferably 42.3 mm or smaller, and even more preferably 42.2 mm or smaller. If the diameter of the core is smaller than the above lower limit, the cover becomes so thick that the resulting golf ball would have reduced resilience. On the other hand, if the diameter of the core is larger than the above upper limit, the cover becomes so thin that it is difficult to mold a cover.

In the case that the core has a diameter of from 40.4 mm to 42.4 mm, the compression deformation amount (deformation amount along the shrinkage direction) of the core when applying a load from 98 N as an initial load to 1275 N as a final load is preferably 1.9 mm or more, more preferably 2.0 mm or more, even more preferably 2.1 mm or more, and is preferably 4.7 mm or less, and more preferably 4.5 mm or less. If the above deformation amount is less than 1.9 mm, the shot feeling becomes poor, while if the above deformation amount is larger than 4.7 mm, the resilience may be lowered.

The center hardness of the core is preferably 30 or larger, more preferably 32 or larger, and even more preferably 35 or larger in Shore D hardness. If the center hardness is smaller than 30 in Shore D hardness, the core becomes so soft that the resilience of the golf ball tends to become lower. The center hardness of the core is preferably 50 or smaller, more preferably 48 or smaller, and even more preferably 45 or smaller in Shore D hardness. If the center hardness is more than 50 in Shore D hardness, the core becomes too hard, resulting in the poor shot feeling. In the present invention, the center hardness of the core is the hardness measured with the Shore D type spring hardness tester at the central point of a cut plane of a core which has been cut into two halves.

The surface hardness of the core is preferably 20 or larger, more preferably 25 or larger, and even more preferably 30 or larger in Shore D hardness. If the surface hardness is less than 20 in Shore D hardness, the core becomes so soft and the resilience may be lowered. The surface hardness of the core is preferably 70 or smaller, more preferably 69 or smaller, and even more preferably 68 or smaller in shore D hardness. If the surface hardness is more than 70 in Shore D hardness, the core becomes so hard and the shot feeling may be lowered.

In one preferable embodiment, the core having the surface hardness larger than the center hardness may be used as the core. The hardness difference (surface hardness–center hardness) between the surface hardness and the center hardness of the core in the golf ball of the present invention is preferably 4 or larger, more preferably 7 or larger in Shore D hardness. If the surface hardness is larger than the center hardness, the launch angle becomes high and the spin rate becomes low, thereby improving the flight distance. Further, in this case, the hardness difference (surface hardness–center hardness) between the surface hardness and the center hardness of the core in the golf ball of the present invention is preferably 40 or less, more preferably 35 or less. If the hardness difference is too large, the durability of the golf ball may deteriorate.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

EXAMPLES

Hereinafter, the present invention will be described in detail by way of example. The present invention is not limited to examples described below. Various changes and modifications can be made without departing from the spirit and scope of the present invention.
[Evaluation Method]
(1) Hardness of Center and Core (Shore D Hardness)

A type P1 auto loading durometer manufactured by Kobunshi Keiki Co., Ltd., provided with a Shore D type spring hardness tester prescribed in ASTM-D2240 was used to measure the surface hardness and the center hardness of the center and the core. Shore D hardness measured at the surfaces of the center and the core are defined as the surface hardness of the center and the core, respectively. The core was cut into two hemispheres to obtain a cut plane, and a Shore D hardness measured at the center of the cut plane was used as the center hardness of the core.
(2) Slab Hardness (Shore D Hardness)

Sheets with a thickness of about 2 mm were produced by heat-pressing the cover composition and the intermediate layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.
(3) Compression Deformation Amount (mm)

A compression deformation amount of the center, core and golf ball (a shrinking amount of the center, core, and golf ball in the compression direction thereof), when applying a load from 98 N as an initial load to 1275 N as a final load to the center, core and golf ball, was measured.
(4) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(5) Adhesion of Paint Film

Each painted golf ball was hit 100 times repeatedly with a driver (1W) attached to a swing robot manufactured by TRU-ETEMPER CO, at the head speed of 45 m/sec. The degree of the peeling of the paint film was observed and evaluated based on the following criteria.

G (Good): The paint film did not peel off at all, or the area where the paint film peeled off was less than 1 mm².

P (Poor): The area where the paint film peeled off was 1 mm² or more.

(6) Flight Distance

A metal-head W#1 driver (XXIO, S shaft, loft: 10.0°, manufactured by SR1 Sports Limited) was installed on a swing robot manufactured by TRUETEMPER CO. Golf balls were hit at a head speed of 45 m/sec, and the flight distances (the distance from the launch point to the stop point) were measured. This measurement was conducted ten times for each golf ball, and the average value was used as the flight distance of the golf ball.

(7) Durability

A metal-head W#1 driver (XXIO, S shaft, loft: 11°, manufactured by SR1 Sports Limited) was installed on a swing robot manufactured by Golf Laboratories, Inc. Each golf ball was hit at a head speed of 45 m/sec. This procedure was repeated, and the number of hits required to break the golf ball was counted. The number of hits for golf ball No. 11 was defined as an index of 100, and the durability of each golf ball was represented by converting the number of hits for each golf ball into this index. A greater index value indicates that the durability of the golf ball is excellent.

(8) FT-IR Measurement

Measuring samples were taken from the pellet of the cover composition before injection molding and the cover after molding. These samples were analyzed with Fourier transform infrared spectrophotometer (Auto IMAGE FT-IR) available from PerkinElmer, Inc by a macro ATR method (germanium prism, observation diameter: about 1 mm). The area A under a peak around 1600 cm$^{-1}$ and the area B under a peak around 1700 cm$^{-1}$ were determined from the obtained spectrum. FIG. 1 shows a FT-IR spectrum of the cover of the golf ball No. 1 (vertical axis: absorbance). Base lines were drawn for Peak A around 1600 cm$^{-1}$ and Peak B around 1700 cm$^{-1}$, respectively, as shown FIG. 1 and area A, B were calculated. It is noted that Peak A around 1600 cm$^{-1}$ may shift depending on kinds of metal neutralizing the carboxyl group.

[Production of Golf Balls]

(1) Production of Center

The center rubber compositions having the formulations shown in Table 1 were kneaded and heat-pressed in upper and lower molds, each having a hemispherical cavity, at 170° C. for 20 minutes to prepare spherical centers. The amount of barium sulfate was adjusted appropriately to make a golf ball have a weight of 45.4 g.

TABLE 1

| | Center Rubber Composition | Parts by mass |
|---|---|---|
| Formulation | Polybutadiene | 100 |
| | Zinc acrylate | 27 |
| | Zinc oxide | 5 |
| | Dicumyl peroxide | 0.9 |
| | Diphenyl disulfide | 0.5 |
| | Barium sulfate | Appropriate amount*) |

TABLE 1-continued

| | Center Rubber Composition | Parts by mass |
|---|---|---|
| Properties | Diameter (mm) | 39.2 |
| | Compression deformation amount (mm) | 3.8 |
| | Center hardness (Shore D) | 41 |
| | Surface hardness (Shore D) | 50 |

Formulation: parts by mass
*)Depending on the cover composition, adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.

(2) Preparation of Intermediate Layer Composition and Cover Composition

Blending materials shown in Tables 2 to 6 were mixed with a twin-screw kneading extruder to prepare the intermediate layer composition and cover compositions in the pellet form. The extruding conditions of the cover composition were a screw diameter of 45 mm, a screw rotational speed of 200 rpm, and screw L/D=35, and the cylinder temperature of 140 to 200° C. The extruding conditions of the intermediate layer composition were a screw diameter of 45 mm, a screw rotational speed of 200 rpm, and screw L/D=35, and the mixtures were heated to 160 to 230° C. at the die position of the extruder.

TABLE 2

| Intermediate layer composition | Parts by mass |
|---|---|
| Surlyn 8945 | 35 |
| Himilan AM7329 | 30 |
| Rabalon T3221C | 35 |
| Titanium oxide | 4 |
| Melt flow rate (190° C., 2.16 kg) (g/10 min) | 5 |
| Slab hardness (Shore D) | 48 |

Note on Table 2:
SURLYN 8945: a sodium ion neutralized ethylene-methacrylic acid copolymer ionomer resin available from E.I. du Pont de Nemours and Company.
Himilan AM7329: Zinc ion neutralized ethylene-methacrylic acid copolymer ionomer resin available from Du Pont-Mitsui Polychemicals Co., Ltd
Rabalon T3221C: Polystyrene elastomer available from Mitsubishi Chemical Corporation.

(3) Production of Golf Ball Body

The intermediate layer compositions obtained above were injection-molded onto the spherical centers to form the intermediate layers (thickness: 1.0 mm) covering the centers. Subsequently, golf balls were produced by injection-molding the cover composition on the intermediate layer to form the cover. Upper and lower molds have a spherical cavity with pimples, a part of which serves as a hold pin which is extendable and retractable. The cover composition was heated to 200 to 260° C. at the cylinder portion of the injection unit and injected into the mold clamped under a pressure of 15 MPa, and then cooled for 30 seconds. The mold was opened, and the golf ball bodies were taken out from the mold. The surface of the obtained golf ball bodies were treated with sandblast, marked, and painted with a clear paint. The paint was dried in an oven at 40° C. to form a paint film having a thickness of 10 µm, and golf balls having a diameter of 42.8 mm and a mass of 45.4 g were obtained. As the clear paint, a following paint was used.

[Preparation of Clear Paint]
(i) Base Material: Urethane Polyol 60 parts by mass of PTMG250 (BASF Co., polyoxytetramethyleneglycol having a molecular weight of 250), 54 parts by mass of 550U (Sumitomo-Bayer Urethane Co., Ltd, branched polyol having a molecular weight of 550) were dissolved into 120 parts by mass of the solvent (toluene and methylethylketone). The dibutyl-tin-dilaurylate was added in an amount of 0.1 mass % with respect to the total base material. While keeping this polyol at the temperature of 80° C., 66 parts by mass of isophorone diisocyanate was slow-added into the polyol to obtain a urethane polyol having a solid content of 60 mass %, hydroxyl value of 75 mg KOH/g, and a weight average molecular weight of 7808.

(ii) Curing agent: Isophorone diisocyanate available from Sumitomo-Bayer Urethane Co., LTD.

(iii) Mixing ratio: NCO (curing agent)/OH (base material)= 1.2 molar ratio.

TABLE 3

| | | | Golf ball No. | 1 | 2 | 3 | 4 | 5 |
|---|---|---|---|---|---|---|---|---|
| Cover Composition | Resin component | (A) Component | Himilan AM7329 (Zn) | 70 | 70 | — | — | 60 |
| | | | Surlyn 9150 (Zn) | — | — | 70 | — | — |
| | | | Surlyn 9120 (Zn) | — | — | — | 60 | — |
| | | | Surlyn 8945 (Na) | — | — | — | — | — |
| | | | Himilan 1557 (Zn) | — | — | — | — | — |
| | | (B) component | Nucrel N1050H | 30 | — | — | 40 | 40 |
| | | | Nucrel N2050H | — | 30 | 30 | — | — |
| | | | PRIMACOR 5980I | — | — | — | — | — |
| | | | Nucrel N1560 | — | — | — | — | — |
| | (C) component | | Zinc oxide | 2 | 5 | 5 | 1 | 13 |
| | | | Zinc hydroxide | — | — | — | — | — |
| | | | Zinc carbonate | — | — | — | — | — |
| | | | Magnesium stearate | — | — | — | — | — |
| | | | Titanium oxide | 3 | 3 | 3 | 3 | 3 |
| | | | Ultra marine blue | 0.04 | 0.04 | 0.04 | 0.04 | 0.04 |
| | | | P1 = A1/(A1 + B1) | 0.40 | 0.38 | 0.32 | 0.27 | 0.40 |
| | | | P2 = P2/(P1 + B2) | 0.82 | 0.90 | 0.76 | 0.58 | 1.00 |
| | | | P2/P1 | 2.1 | 2.4 | 2.4 | 2.1 | 2.5 |
| | Properties | | Melt flow rate (g/10 min) | 22 | 19 | 16 | 16 | 15 |
| | | | Slab hardness (Shore D) | 60 | 63 | 65 | 60 | 61 |
| | | | Bending stiffness (MPa) | 195 | 221 | 255 | 304 | 272 |
| Core Properties | Core center hardness (Shore D) | | | 41 | 41 | 41 | 41 | 41 |
| | Core surface hardness (Shore D) | | | 51 | 51 | 51 | 51 | 51 |
| | Compression deformation amount (mm) | | | 3.50 | 3.50 | 3.50 | 3.50 | 3.50 |
| Golf ball Properties | Cover thickness (mm) | | | 0.8 | 0.8 | 0.8 | 0.8 | 0.8 |
| | Compression deformation amount (mm) | | | 3.20 | 3.18 | 3.17 | 3.20 | 3.18 |
| | Adhesion of Paint Film | | | G | G | G | G | G |
| | Flight distance (m) | | | 233 | 235 | 236 | 236 | 236 |
| | Durability (Index) | | | 120 | 112 | 109 | 114 | 115 |

Formulation: parts by mass

TABLE 4

| | | | Golf ball No. | 6 | 7 | 8 | 9 | 10 |
|---|---|---|---|---|---|---|---|---|
| Cover Composition | Resin component | (A) Component | Himilan AM7329 (Zn) | — | — | 80 | — | — |
| | | | Surlyn 9150 (Zn) | 70 | 70 | — | — | — |
| | | | Surlyn 9120 (Zn) | — | — | — | 50 | — |
| | | | Surlyn 8945 (Na) | — | — | — | — | — |
| | | | Himilan 1557 (Zn) | — | — | — | — | 70 |
| | | (B) component | Nucrel N1050H | — | 30 | — | 50 | 30 |
| | | | Nucrel N2050H | — | — | 20 | — | — |
| | | | PRIMACOR 5980I | 30 | — | — | — | — |
| | | | Nucrel N1560 | — | — | — | — | — |
| | (C) component | | Zinc oxide | 2 | — | 0.1 | — | 4 |
| | | | Zinc hydroxide | — | 0.2 | — | — | — |
| | | | Zinc carbonate | — | — | — | 15 | — |
| | | | Magnesium stearate | — | — | — | — | — |
| | | | Titanium oxide | 3 | 3 | 3 | 3 | 3 |
| | | | Ultra marine blue | 0.04 | 0.04 | 0.04 | 0.04 | 0.04 |
| | | | P1 = A1/(A1 + B1) | 0.27 | 0.25 | 0.39 | 0.42 | 0.38 |
| | | | P2 = P2/(P1 + B2) | 0.57 | 0.38 | 0.64 | 0.94 | 0.81 |
| | | | P2/P1 | 2.1 | 1.6 | 1.6 | 2.2 | 2.1 |
| | Properties | | Melt flow rate (g/10 min) | 18 | 21 | 15 | 16 | 19 |
| | | | Slab hardness (Shore D) | 62 | 62 | 62 | 61 | 59 |
| | | | Bending stiffness (MPa) | 230 | 214 | 194 | 340 | 207 |
| Core Properties | Core center hardness (Shore D) | | | 41 | 41 | 41 | 41 | 41 |
| | Core surface hardness (Shore D) | | | 51 | 51 | 51 | 51 | 51 |
| | Compression deformation amount (mm) | | | 3.50 | 3.50 | 3.50 | 3.50 | 3.50 |
| Golf ball Properties | Cover thickness (mm) | | | 0.8 | 0.8 | 0.8 | 0.8 | 0.8 |
| | Compression deformation amount (mm) | | | 3.18 | 3.19 | 3.19 | 3.17 | 3.21 |
| | Adhesion of Paint Film | | | G | G | G | G | G |

TABLE 4-continued

| Golf ball No. | 6 | 7 | 8 | 9 | 10 |
|---|---|---|---|---|---|
| Flight distance (m) | 235 | 234 | 233 | 237 | 233 |
| Durability (Index) | 107 | 106 | 118 | 103 | 100 |

Formulation: parts by mass

TABLE 5

| | | | Golf ball No. | 11 | 12 | 13 | 14 | 15 |
|---|---|---|---|---|---|---|---|---|
| Cover Composition | Resin component | (A) Component | Himilan AM7329 (Zn) | 70 | 70 | 70 | 60 | — |
| | | | Surlyn 9150 (Zn) | — | — | — | — | — |
| | | | Surlyn 9120 (Zn) | — | — | — | — | — |
| | | | Surlyn 8945 (Na) | — | — | — | 10 | — |
| | | | Himilan 1557 (Zn) | — | — | — | — | 70 |
| | | (B) component | Nucrel N1050H | 30 | 30 | 30 | 30 | 30 |
| | | | Nucrel N2050H | — | — | — | — | — |
| | | | PRIMACOR 5980I | — | — | — | — | — |
| | | | Nucrel N1560 | — | — | — | — | — |
| | (C) component | | Zinc oxide | — | — | — | 1 | — |
| | | | Zinc hydroxide | — | — | 21 | — | — |
| | | | Zinc carbonate | — | — | — | — | — |
| | Magnesium stearate | | | — | 10 | — | — | — |
| | Titanium oxide | | | 3 | 3 | 3 | 3 | 3 |
| | Ultra marine blue | | | 0.04 | 0.04 | 0.04 | 0.04 | 0.04 |
| | P1 = A1/(A1 + B1) | | | 0.39 | 0.48 | 0.39 | 0.40 | 0.38 |
| | P2 = P2/(P1 + B2) | | | 0.39 | 0.50 | 1.00 | 0.81 | 0.38 |
| | P2/P1 | | | 1.0 | 1.0 | 2.6 | 2.0 | 1.0 |
| | Properties | Melt flow rate (g/10 min) | | 25 | 31 | *1) | 23 | 25 |
| | | Slab hardness (Shore D) | | 59 | 57 | — | 60 | 57 |
| | | Bending stiffness (MPa) | | 178 | 170 | — | 192 | 174 |
| Core Properties | Core center hardness (Shore D) | | | 41 | 41 | — | 41 | 41 |
| | Core surface hardness (Shore D) | | | 51 | 51 | — | 51 | 51 |
| | Compression deformation amount (mm) | | | 3.50 | 3.50 | — | 3.50 | 3.50 |
| Golf ball Properties | Cover thickness (mm) | | | 0.8 | 0.8 | — | 0.8 | 0.8 |
| | Compression deformation amount (mm) | | | 3.20 | 3.21 | — | 3.19 | 3.22 |
| | Adhesion of Paint Film | | | G | P | — | G | G |
| | Flight distance (m) | | | 232 | 231 | — | 233 | 231 |
| | Durability (Index) | | | 100 | 70 | — | 98 | 57 |

Formulation: parts by mass
*1) Impossible to mold

TABLE 6

| | | | Golf ball No. | 16 | 17 | 18 |
|---|---|---|---|---|---|---|
| Cover Composition | Resin component | (A) Component | Himilan AM7329 (Zn) | 70 | 90 | 40 |
| | | | Surlyn 9150 (Zn) | — | — | — |
| | | | Surlyn 9120 (Zn) | — | — | — |
| | | | Surlyn 8945 (Na) | — | — | — |
| | | | Himilan 1557 (Zn) | — | — | — |
| | | (B) component | Nucrel N1050H | — | 10 | 60 |
| | | | Nucrel N2050H | — | — | — |
| | | | PRIMACOR 5980I | — | — | — |
| | | | Nucrel N1560 | 30 | — | — |
| | (C) component | | Zinc oxide | — | 5 | 5 |
| | | | Zinc hydroxide | — | — | — |
| | | | Zinc carbonate | — | — | — |
| | Magnesium stearate | | | — | — | — |
| | Titanium oxide | | | 3 | 3 | 3 |
| | Ultra marine blue | | | 0.04 | 0.04 | 0.04 |
| | P1 = A1/(A1 + B1) | | | 0.35 | 0.48 | 0.35 |
| | P2 = P2/(P1 + B2) | | | 0.35 | 1.00 | 0.82 |
| | P2/P1 | | | 1.0 | 2.1 | 2.4 |
| | Properties | Melt flow rate (g/10 min) | | 13 | *1) | 70 |
| | | Slab hardness (Shore D) | | 61 | — | 55 |
| | | Bending stiffness (MPa) | | 257 | — | 177 |
| Core Properties | Core center hardness (Shore D) | | | 41 | — | 41 |
| | Core surface hardness (Shore D) | | | 51 | — | 51 |
| | Compression deformation amount (mm) | | | 3.50 | — | 3.50 |

TABLE 6-continued

| Golf ball No. | | 16 | 17 | 18 |
|---|---|---|---|---|
| Golf ball Properties | Cover thickness (mm) | 0.8 | — | 0.8 |
| | Compression deformation amount (mm) | 3.20 | — | 3.23 |
| | Adhesion of Paint Film | G | — | G |
| | Flight distance (m) | 234 | — | 225 |
| | Durability (Index) | 75 | — | 10 |

Formulation: parts by mass
*1) Impossible to mold

Notes on Tables No. 3 to No. 6

HIMILAN AM7329: a zinc ion neutralized ethylene-methacrylic acid copolymer ionomer resin (Acid content: 15 mass % or more, Bending stiffness: 221 MPa, Melt Flow Rate (190° C., 2.16 kg): 5 g/10 min) available from Du Pont-Mitsui Polychemicals Co., Ltd.

SURLYN 9150: a zinc ion neutralized ethylene-methacrylic acid copolymer ionomer resin (Acid content: 15 mass % or more, Bending stiffness: 270 MPa, Melt Flow Rate (190° C., 2.16 kg): 4.5 g/10 min) available from E.I. du Pont de Nemours and Company.

SURLYN 9120: a zinc ion neutralized ethylene-methacrylic acid copolymer ionomer resin (Acid content: 15 mass % or more, Bending stiffness: 440 MPa, Melt Flow Rate (190° C., 2.16 kg): 1.3 g/10 min) available from E.I. du Pont de Nemours and Company.

SURLYN 8945: a sodium ion neutralized ethylene-methacrylic acid copolymer ionomer resin (Acid content: 15 mass % or more, Bending stiffness: 272 MPa, Melt Flow Rate (190° C., 2.16 kg): 4.5 g/10 min) available from E.I. du Pont de Nemours and Company.

HIMILAN 1557: a zinc ion neutralized ethylene-methacrylic acid copolymer ionomer resin (Acid content: less than 15 mass %, Bending stiffness: 215 MPa, Melt Flow Rate (190° C., 2.16 kg): 5.5 g/10 min, Shore D hardness: 59) available from Du Pont-Mitsui Polychemicals Co., Ltd.

Nucrel 1050H: an ethylene-methacrylic acid copolymer (melt flow rate (190° C.*2.16 kg): 500 g/10 min, Bending stiffness: 79 MPa) available from Du Pont-Mitsui Polychemicals Co., Ltd.

Nucrel 2050H: an ethylene-methacrylic acid copolymer (melt flow rate (190° C.*2.16 kg): 500 g/10 min, Bending stiffness: 82 MPa) available from Du Pont-Mitsui Polychemicals Co., Ltd.

Nucrel N1560: an ethylene-methacrylic acid copolymer (melt flow rate (190° C.*2.16 kg): 60 g/10 min, Shore D hardness: 53, Bending stiffness: 83 MPa) available from Du Pont-Mitsui Polychemicals Co., Ltd.

PRIMACOR 59801: an ethylene-acrylic acid copolymer (melt flow rate (190° C.*2.16 kg): 300 g/10 min, Bending stiffness: 80 MPa) available from Dow Chemical Company.

Zinc oxide: Yoneyama Yakuhin Kogyo Co., LTD (no surface treatment)

Zinc hydroxide: Yoneyama Yakuhin Kogyo CO., LTD

Zinc carbonate: Yoneyama Yakuhin Kogyo CO., LTD

The golf ball resin compositions comprising, (A) an ionomer resin consisting of a metal ion-neutralized product of a binary copolymer composed of an olefin and an α,β-unsaturated carboxylic acid having 3 to 8 carbon atoms; (B) a binary copolymer composed of an olefin and an α,β-unsaturated carboxylic acid having 3 to 8 carbon atoms, and (C) a zinc compound, wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin component has a melt flow rate (190° C., 2.16 kg) of 15 g/10 min or more were excellent in fluidity, and enabled to mold a thin cover. Further, P2/P1 were 1.5 or more in every golf ball resin composition of the present invention, thus it is confirmed that the neutralization was conducted with (C) the zinc compound. Golf balls No. 1 to No. 10, and No. 14 using these golf ball resin compositions were excellent in the durability and flight distance, irrespective of having a cover with a high hardness.

Golf ball No. 12 is the case that the metal salt of a fatty acid was used to improve the fluidity. Since the metal salt of the fatty acid bleed out from the surface of the golf ball body, the adhesion of the paint film was lowered. Because of too low fluidity, it was impossible to mold Golf ball No. 13. Golf ball No. 15 is the case that (C) the zinc compound was not contained. The durability was lowered. In Golf ball No. 16, since the melt flow rate was as low as 13 g/10 min, it was necessary to increase the molding temperature to 300° C. Therefore, the resin component constituting the cover composition thermally decomposed and the durability was lowered. Golf ball No. 17 was the case that the content of (A) component was too high. It was impossible to mold the golf ball. Golf ball No. 18 was the case the content of (A) component was too low. The flight distance and the durability was lowered.

The present invention is suitable for the golf ball having an ionomer cover. This application is based on Japanese Patent application No. 2010-102533 filed on Apr. 27, 2010, the contents of which are hereby incorporated by reference.

The invention claimed is:

1. A golf ball resin composition comprising, a resin component and (C) a zinc compound,
wherein the resin component consists of (A) an ionomer resin consisting of a metal ion-neutralized product of a binary copolymer composed of an olefin and an α,β-unsaturated carboxylic acid having 3 to 8 carbon atoms and (B) a binary copolymer composed of an olefin and an α,β-unsaturated carboxylic acid having 3 to 8 carbon atoms,
wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 15 g/10 min or more and a slab hardness ranging from 61 to 70 in Shore D hardness,
wherein (A) the ionomer resin has a melt flow rate (190° C., 2.16 kg) ranging from 0.1 g/10 min to 30 g/10 min, and
wherein (B) the binary copolymer has a melt flow rate (190° C., 2.16 kg) ranging from 100 g/10 min to 1000 g/10 min.

2. The golf ball resin composition according to claim 1, wherein (A) the ionomer resin has the α,β-unsaturated carboxylic acid component in a content of 15 mass % or more.

3. The golf ball resin composition according to claim 1, wherein (A) the ionomer resin is neutralized with zinc.

4. The golf ball resin composition according to claim 1, wherein (C) the zinc compound is zinc oxide, zinc hydroxide, or zinc carbonate.

5. The golf ball resin composition according to claim 1, wherein A1, A2, B1, and B2 defined below satisfy following expressions:

$$P1=A1/(A1+B1)$$

$$P2=A2/(A2+B2)$$

$$0.2 \leq P1 \leq 1.0$$

$$0.3 \leq P2 \leq 1.0$$

$$1.5 \leq P2/P1 \leq 2.5$$

wherein A1 is defined as an area under a peak around 1600 $cm^{-1}$ and B1 is defined as an area under a peak around 1700 $cm^{-1}$ in a spectrum obtained by analyzing the golf ball composition before injection molding by FT-IR, and A2 is defined as an area under a peak around 1600 $cm^{-1}$ and B2 is defined as an area under a peak around 1700 $cm^{-1}$ in a spectrum obtained by analyzing the golf ball composition after injection molding by FT-IR.

6. The golf ball resin composition according to claim 1, wherein a degree of neutralization of the carboxyl groups contained in (A) the ionomer resin ranges from 15 mole % to 90 mole %.

7. The golf ball resin composition according to claim 1, wherein (A) the ionomer resin has a bending stiffness ranging from 140 MPa to 550 MPa.

8. The golf ball resin composition according to claim 1, wherein (A) the ionomer resin has a slab hardness ranging from 50 to 75 in Shore D hardness.

9. A golf ball comprising a constituent member formed by injection molding a golf ball resin composition which comprises a resin component and (C) a zinc compound,
wherein the resin component consists of (A) an ionomer resin consisting of a metal ion-neutralized product of a binary copolymer composed of an olefin and an α,β-unsaturated carboxylic acid having 3 to 8 carbon atoms and (B) a binary copolymer composed of an olefin and an α,β-unsaturated carboxylic acid having 3 to 8 carbon atoms,
wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 15 g/10 min or more and a slab hardness ranging from 61 to 70 in Shore D hardness,
wherein (A) the ionomer resin has a melt flow rate (190° C., 2.16 kg) ranging from 0.1 g/10 min to 30 g/10 min, and
wherein (B) the binary copolymer has a melt flow rate (190° C., 2.16 kg) ranging from 100 g/10 min to 1000 g/10 min.

10. The golf ball according to claim 9, wherein the constituent member is a cover.

11. The golf ball according to claim 10, wherein the cover has a thickness ranging from 0.5 mm to 1.5 mm.

12. The golf ball according to claim 10, wherein the golf ball has an intermediate layer with a thickness ranging from 0.3 mm to 6.0 mm.

13. The golf ball according to claim 12, wherein the intermediate layer has a hardness ranging from 30 to 65 in Shore D hardness.

14. The golf ball according to claim 9, wherein (A) the ionomer resin has the α,β-unsaturated carboxylic acid component in a content of 15 mass % or more, and is neutralized with zinc.

15. The golf ball according to claim 9, wherein (A) the binary ionomer resin has a bending stiffness ranging from 140 MPa to 550 MPa, a melt flow rate (190° C., 2.16 kg) ranging from 0.1 g/10 min to 30 g/10 min, and a slab hardness ranging from 50 to 75 in Shore D hardness.

16. The golf ball according to claim 9, wherein (C) the zinc compound is zinc oxide, zinc hydroxide, or zinc carbonate.

17. The golf ball according to claim 9, wherein A1, A2, B1, and B2 defined below satisfy following expressions:

$$P1=A1/(A1+B1)$$

$$P2=A2/(A2+B2)$$

$$0.2 \leq P1 \leq 1.0$$

$$0.3 \leq P2 \leq 1.0$$

$$1.5 \leq P2/P1 \leq 2.5$$

wherein A1 is defined as an area under a peak around 1600 $cm^{-1}$ and B1 is defined as an area under a peak around 1700 $cm^{-1}$ in a spectrum obtained by analyzing the golf ball composition before injection molding by FT-IR, and A2 is defined as an area under a peak around 1600 $cm^{-1}$ and B2 is defined as an area under a peak around 1700 $cm^{-1}$ in a spectrum obtained by analyzing the golf ball composition after injection molding by FT-IR.

* * * * *